United States Patent [19]
Kanesaka et al.

[11] Patent Number: 5,717,790
[45] Date of Patent: Feb. 10, 1998

[54] IMAGE READING APPARATUS, METHOD AND SYSTEM

[75] Inventors: Yoshinori Kanesaka; Shuichi Ichinose, both of Nagano, Japan

[73] Assignee: Seiko Epson Corporation, Tokyo, Japan

[21] Appl. No.: 409,602

[22] Filed: Mar. 24, 1995

[30] Foreign Application Priority Data

Mar. 25, 1994 [JP] Japan ..................... 6-079497
Jan. 17, 1995 [JP] Japan ..................... 7-005081

[51] Int. Cl.$^6$ ..................................... H04N 1/04
[52] U.S. Cl. .................. 382/274; 358/461; 358/475
[58] Field of Search .................... 358/445, 446, 358/475, 579, 505, 474, 461, 464, 486, 482, 483, 494; 355/208, 214; 382/274; 399/207, 220; H04N 1/04

[56] References Cited

U.S. PATENT DOCUMENTS

| | | | |
|---|---|---|---|
| 4,791,493 | 12/1988 | Ogura et al. | 358/294 |
| 4,888,616 | 12/1989 | Nanamura et al. | 355/202 |
| 5,038,225 | 8/1991 | Maeshima et al. | 358/461 |
| 5,212,569 | 5/1993 | Takada et al. | 358/475 |
| 5,550,651 | 8/1996 | Terajima | 358/496 |

*Primary Examiner*—Kim Vu
*Attorney, Agent, or Firm*—Sughrue, Mion, Zinn, Macpeak & Seas, PLLC

[57] ABSTRACT

This image reading apparatus includes: light sources, a line sensor for photoelectrically converting light from an original, a light source control section for controlling the lighting time of each light source; a gamma correction section for converting a photoelectrically converted electric signal to image data with a gamma function and a controller for controlling the light source control section and the gamma correction section. The controller adjusts the lighting time of the light source or the gradient of the gamma function in response to a specified lightness from an external computer so that image data in such specified lightness can be obtained. For example, in the case where the lightness is increased, if the user wishes a high quality image, the lighting time is increased, whereas if the user attaches importance to high speed reading, the gradient of the gamma function is increased. Further, in the case where the lightness is decreased, if the user wishes a high quality image, the gradient of the gamma function is decreased, whereas if the user attaches importance to high speed reading, the lighting time is shortened.

9 Claims, 4 Drawing Sheets

IMAGE READING APPARATUS, METHOD AND SYSTEM

BACKGROUND OF THE INVENTION

1. Field of the Invention

The invention relates to an image reading apparatus and an image reading system for converting the image of an original into an electric signal.

1. Prior Art

An image reading apparatus of, e.g., flat bed type includes, as known well, an original table constructed of a transparent board, a light source for irradiating an original, and a line sensor having a multiplicity of photoelectric conversion elements. Such image reading apparatus irradiates a beam of light onto the original placed on the original table, detects reflected light or transmitted light while moving the line sensor, and converts density changes in the original into an electric signal.

However, since an original, from which only small reflected light or transmitted light is obtained, gives small input light intensity to the line sensor, the input light amount to the sensor (input light intensity x light storing time) becomes close to the noise level, which in turn imposes the problem of impaired image quality.

To overcome this problem, an image reading apparatus has been proposed in, e.g., Unexamined Japanese Patent Publication No. Hei. 4-335760. This image reading apparatus is provided as increasing the level of a light amount signal from the line sensor by increasing the input light amount to the line sensor with the light storing time per line increased in accordance with the density of an original if the density of the original is high as well as the input light intensity to the sensor is small, and as converting the light amount signal whose level has been increased into an image signal using a gamma function.

According to this image reading apparatus, although the lightness of the original is increased, the original reading speed is reduced in proportion to the increase in the light storing time, which is a problem. In addition, the user has to alter the operation panel settings of the image reading apparatus in accordance with a change in density of an original every time the original is changed, which imposes another problem of cumbersome operation.

To overcome these problems, proposed is a method of increasing the level of a light amount signal by increasing the irradiation intensity of a light source with the original reading speed kept at a conventional level.

However, this method sacrifices the life of the light source to increase the irradiation intensity; i.e., the service life of the light source is inevitably shortened.

SUMMARY OF THE INVENTION

The invention has been made in consideration of the aforementioned circumstances. Accordingly, an object of the invention is to provide an image reading apparatus which is capable of reading originals having different densities with desired lightnesses without sacrificing the life of the light source, and which is capable of meeting image reading needs of a user by providing a high speed reading mode requiring a shorter reading time, a high image quality reading mode though the reading speed is not so high, or a like mode when such originals are to be read with desired lightnesses.

Another object of the invention is to provide an image reading method in an image reading system including an image reading apparatus that can externally adjust the lightness of an output image and an external apparatus that adjusts the lightness with respect to the image reading apparatus, the method being capable of meeting image reading needs of a user by providing a high speed reading mode requiring a shorter reading time, a high image quality reading mode though the reading speed is not so high, or a like mode when originals having different densities are to be read with desired lightnesses.

Still another object of the invention is to provide an image reading system capable of meeting image reading needs of a user by providing a high speed reading mode requiring a shorter reading time, a high image quality reading mode though the reading speed is not so high, or a like mode when originals having different densities are to be read with desired lightnesses.

A first aspect of the invention is applied to an image reading apparatus in which an original is irradiated by a light source; light from the original is converted into an electric signal; and the electric signal is converted into image data with a predetermined gamma function. The image reading apparatus includes: a light amount signal adjusting means for adjusting a light amount signal outputted from a line sensor as a result of operating either a lighting time of the light source or an interval of a shift pulse of the line sensor; a gamma function adjusting means for adjusting the gamma function; and a mode selecting means for selecting a first reading mode or a second reading mode at the request of a user, the first reading mode being such as to obtain image data having a predetermined lightness through adjustment of the light amount signal made by the light amount signal adjusting means, the second reading mode being such as to obtain image data having the predetermined lightness through adjustment of the gamma function made by the gamma function adjusting means.

A second aspect of the invention is applied to a lightness adjustment method in an image reading system including an image reading apparatus capable of externally adjusting a lightness of an output image and an external apparatus for adjusting the lightness with respect to the image reading apparatus. The lightness adjustment method involves the steps of: causing a preliminary reading operation of an original by the image reading apparatus and sending the image data obtained as a result of the preliminary reading operation to the external apparatus; causing the external apparatus display the image data obtained as a result of the preliminary reading operation on the external apparatus; causing the user to input lightness adjustment data to the external apparatus; processing the image data obtained as a result of the preliminary reading operation based on the inputted lightness adjustment data on the external apparatus and displaying the processed image data; and sending the inputted lightness adjustment data to the image reading apparatus.

A third aspect of the invention is applied to an image reading system for performing a reading operation after a lightness of an output image is first adjusted and a high image quality reading mode or a high speed reading mode is thereafter selected. The image reading system includes: rough reading means for roughly reading an original by reducing an amount of the data within a predetermined range of the original; display means for displaying the image data stored in an image memory, which were read by the rough reading means in advance; a lightness specifying means for adjusting a lightness by viewing a displayed image and then specifying a predetermined lightness for the displayed image; a mode selecting means for selecting one mode from a high image quality reading mode and a high speed reading mode, the high image quality reading mode for reading the image data by controlling image quality, the high speed reading mode for reading image data by controlling reading speed; and a detailed reading means for performing a detailed reading operation with the lightness set by the lightness adjusting means and, with the mode selecting means.

The image reading apparatus according to the first aspect of the invention is characterized as allowing the user to select either the first reading mode that produces image data having a desired lightness by adjusting the light amount signal outputted from the sensor as a result of operating either the lighting time of the light source or the interval of the shift pulse of the line sensor or the second reading mode that produces image data having the desired lightness through gamma function adjustment at the request of the user.

For example, in the case where lightness is increased, and if the user attaches importance to image quality, then the user selects the first reading mode to adjust the lighting time of the light source or the interval of the shift pulse of the line sensor, so that high quality image data with high S/N ratio can be obtained, whereas if the user attaches importance to reading time, then the user selects the second reading mode to increase the gradient of the gamma function, so that the reading time is not increased.

Further, in the case where lightness is decreased, and if the user wishes to prevent image quality from being impaired, then the user selects the second reading mode to decrease the gradient of the gamma function, whereas if the user wishes to shorten the reading time, then the user selects the first reading mode to adjust the lighting time of the light source or the interval of the shift pulse of the line sensor, so that the reading time can be shortened.

In this way, the needs of the user can be flexibly accommodated even if the same lightness is to be obtained.

It is preferred that this apparatus be designed so that when the first reading mode is selected by the user, the lighting time of the light source or the interval of the shift pulse of the line sensor is adjusted automatically, and that when the second reading mode is selected by the user, the gamma function is adjusted automatically. As a result of this design, the user can obtain a desired output image only by specifying lightness, which is visibly checked with ease and which is one of the most important factors for the user and selecting the reading mode without having to deal with cumbersome factors such as the light source and the gamma function at all.

It is preferred that adjustments using an arbitrary gamma function be made available for reading operations by downloading such gamma function to the image reading apparatus from the external apparatus, in addition to adjustments made by the method programmed in advance in the image reading apparatus. This further increases freedom in the reading operation.

Still further, the method according to the second aspect of the invention is characterized as displaying a result obtained by subjecting an original to the preliminary reading operation using the image reading apparatus while sending such result to the external apparatus such as a personal computer so that the user can input lightness adjustment data to the external apparatus after checking the displayed result of the preliminary reading operation. As a result of this operation, the lightness obtained as a result of the preliminary reading operation changes in accordance with the input on the display. Therefore, the user can determine an appropriate lightness by checking such change. The determined lightness is sent to the image reading apparatus, and an image in such lightness can be finally produced at a desired reading speed or with a desired image quality.

DETAILED DESCRIPTION OF THE PREFERRED EMBODIMENTS

Figure 1:
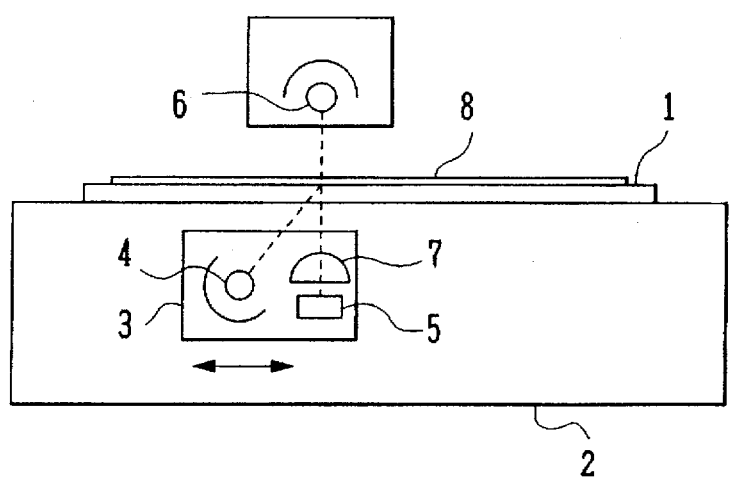
FIG. 1 is a block diagram showing a general construction of a flat bed type image reading apparatus, which is an embodiment of the invention.

FIG. 1 shows a general construction of a flat bed type image reading apparatus, which is an embodiment of the invention.

An original table 1 formed of a transparent board such as glass is provided on the upper surface of a boxlike frame 2. Inside the frame 2 is a carriage 3, which is moved in parallel with the original table 1 by a not shown driving unit. The carriage 3 has a light source 4 and a line sensor 5 therein. A beam of light irradiated from the light source 4 is reflected by the surface of an original 8 placed on the original table 1, and the reflected light is converged onto the line sensor 5 by a converging lens 7. It may be noted that a charge stored optical sensor such as a CCD can be used as the line sensor 5.

Above the original table 1 is a second light source 6 that similarly moves in association with the movement of the carriage 3 to read a transparent original such as a photographic film. The number of the light source and the number of the line sensor are not limited by this embodiment. It is applicable to employ a plurality of light sources and a plurality of line sensors.

Figure 2:
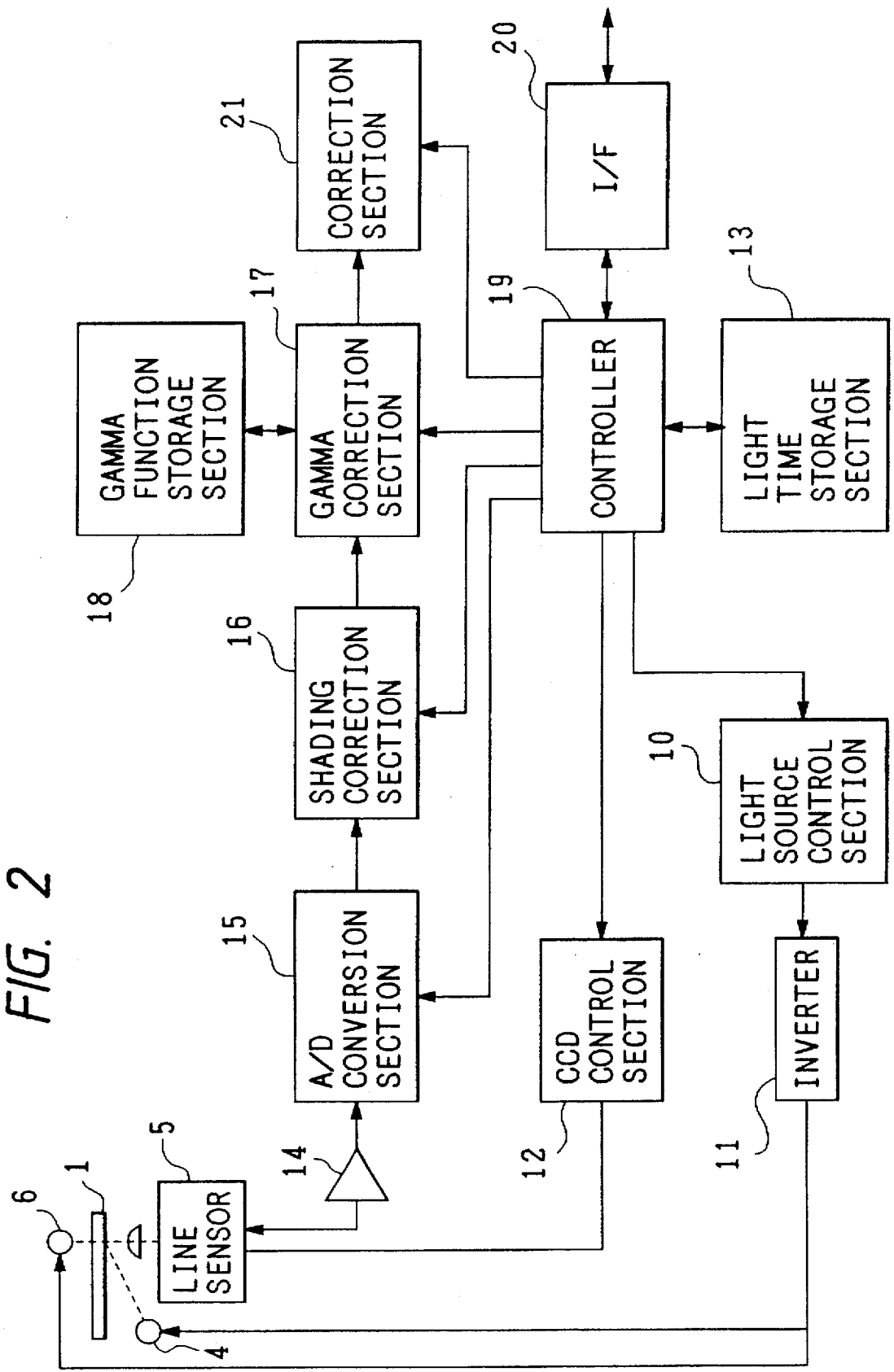
FIG. 2 is a block diagram showing a functional configuration of a light source control and sensor signal processing unit in the embodiment shown in FIG. 1.

FIG. 2 shows a functional configuration of a light source control and sensor signal processing unit in the thus constructed image reading apparatus.

In FIG. 2, a light source control section 10 controls the lighting time of the light source 4 or 6 based on time data read from a lighting time storage section 13 in response to control made by a controller 19, which will be described later. A control signal from this light source control section 10 is outputted to an inverter 11 so that the inverter 11 turns on the light source 4 or 6 for the selected time.

The lighting time storage section 13 stores at least three kinds of time data. That is, a standard lighting time T1, a second lighting time T2 that is 1.6 times the standard lighting time T1, and a third lighting time T3 that is 1/1.6 times the standard lighting time T1.

A CCD control section 12 generates a shift pulse in synchronism with the lighting timing of the light source 4 or 6, and controls the reading operation by the line sensor 5 in accordance with the carriage 3 operating speed.

An A/D conversion section 15 converts a light amount signal received from the line sensor 5 through an amplifier 14 into a digital signal, and delivers the converted signal to a shading correction section 16. The shading correction section 16 corrects, e.g., sensitivity variations per photoelectric element contained in the light amount signal from the line sensor 5.

A gamma correction section 17 selects one from a plurality of kinds of gamma functions stored in a gamma function storage section 18 based on a signal from an external apparatus (e.g., a personal computer), and converts the corrected light amount signal from the shading correction section 16 into an image signal using the selected gamma function.

The gamma function storage section 18 stores at least three kinds of gamma functions: a standard gamma function $Y_1$, a high density original gamma function $Y_2$, and a low density original gamma function $Y_3$. The standard gamma function $Y_1$ converts the total range of a light amount signal from the line sensor 5 into an image signal under high linearity (see FIG. 3). The high density original gamma function $Y_2$ converts mainly the low range of a light amount signal into an image signal of higher level compared with the standard gamma function $Y_1$ (see FIG. 3). The low density original gamma function $Y_3$ converts the total range of a light amount signal into an image signal of lower level compared with the standard gamma function $Y_1$ (see FIG. 4).

The controller 19 is constructed of a microcomputer including a CPU, a RAM, and a ROM, and connected to an external image processing apparatus, e.g., a personal computer, through an interface 20. The controller 19 controls the lighting time of the light source 4 or 6, and selects a gamma function in response to a command from the personal computer.

It may be noted that reference numeral 21 denotes a correction section for making conversions such as color correction, edge enhancement, and enlargement/reduction of a region.

An operation of the thus configured apparatus will be described next.

A user connects a not shown personal computer to the interface 20 of this image reading apparatus, puts the original 8 on the original table 1, and gives a preliminary reading operation command from the personal computer. By the term "preliminary reading operation" it is intended to mean the operation of roughly reading the original image in order to specify the reading range, select the reading lightness, and the like prior to an image data reading operation desired by the user (hereinafter referred to as "detailed reading operation").

Figure 5A:
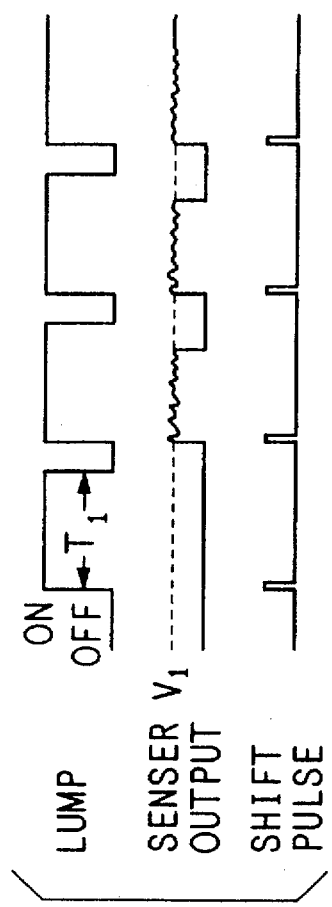
FIGS. 5(a), (b) and (c) are timing charts showing relationships in timing among the lighting of a lamp, the sensor output, and the shift pulse in the embodiment shown in FIG. 1.

Once the preliminary reading operation command is given, the controller 19 turns on the light source 4 (the light source 6 in the case of reading a transparent original) only for the standard lighting time T1 at respective read line positions while sequentially moving the carriage 3 to the respective read line positions. As a result of this operation, an amount of charges (signal charges) proportional to a reflectance (or transmittance) of the original 8 at each read line position is stored in the line sensor 5. The controller 19 outputs a shift pulse to the CCD control section 12 upon elapse of the lighting time T1 at each line read position, so that not only the charges stored in the line sensor are sequentially applied to the amplifier 14 but also the carriage 3 is moved to the next read line position at a predetermined speed. The reading operation timings for this case are shown in FIG. 5(a).

An output signal V from the line sensor 5 is converted into a digital light amount signal by the A/D conversion section 15 after amplified by the amplifier 14, then outputted to the shading correction section 16, and subsequently applied to the gamma correction section 17 to be converted into an image signal I with the standard gamma function $Y_1$. This image signal I is outputted to the personal computer through the interface 20, and displayed on a display.

If the user is agreeable with the lightness of the image which has been subjected to the preliminary reading operation with the standard settings T1, $Y_1$ and displayed, then the user gives a detail reading operation command. As a result, the image reading apparatus not only irradiates a beam of light onto the original for the standard lighting time T1, but also performs the detailed reading operation with the standard gamma function $Y_1$. The reading operation timings for this case are shown in FIG. 5(a).

Figure 3:
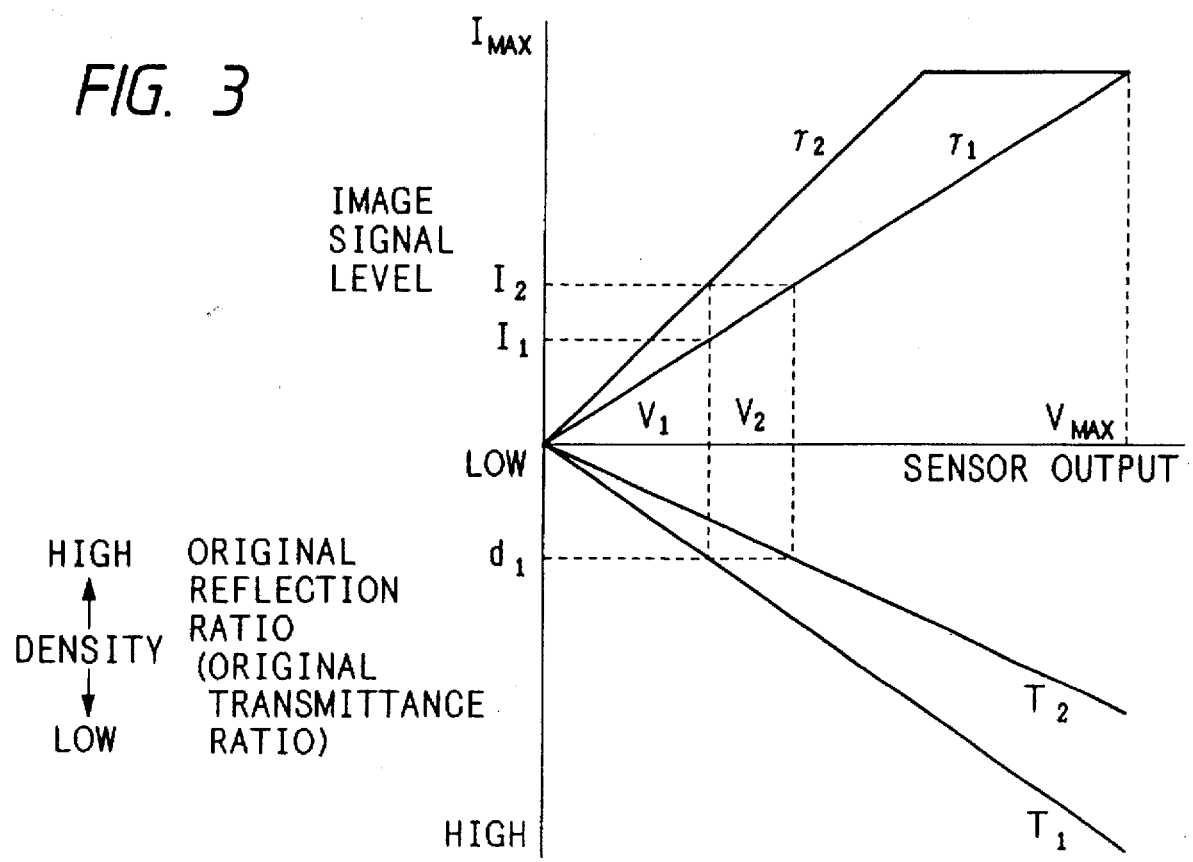
FIG. 3 is a diagram showing a relationship among the reflectance of an original, the sensor output, and the image signal level in the case where lightness is increased in the embodiment shown in FIG. 1.

As a result of the detailed reading operation performed with the standard settings T1, $Y_1$, an original with a density of d1 is outputted as a signal whose output level is V1 from the line sensor 5 as shown in FIG. 3. This signal, after subjected to predetermined processing at the amplifier 14, the A/D conversion section 15, and the shading correction section 16, is inputted to the gamma correction section 17. The thus processed signal is corrected with the selected standard gamma function $Y_1$ in the gamma correction section 17 and the corrected signal is outputted as an image signal whose level is I1.

On the other hand, in the case where the user wishes to have image data processed somewhat lighter because the illuminance of the image displayed as a result of the preliminary reading operation is low (e.g., an inadequately exposed photograph), the user takes the steps of setting the lightness one level higher, and then sending a detailed reading operation command signal from the computer to the image reading apparatus.

Then, the controller 19 of the image reading apparatus not only instructs the light source control section 10 to set the standard lighting time T1 as the lighting time, but also directs the gamma correction section 17 to select the high density original gamma function $Y_2$ as the gamma function, so that the image reading apparatus starts the detailed reading operation. It may be noted that the high density original gamma function $Y_2$ has, as shown in FIG. 3, a gradient of the image signal level with respect to the sensor output 1.6 times the standard gamma function $Y_1$.

As a result of this operation, as shown in FIG. 3, while the image signal of the original whose density is d1 is converted into a signal whose level is V1 from the line sensor 5 as described above, an image signal I2 having a higher level than the image signal processed with the standard gamma function is obtained in this case since the high density original gamma function $Y_2$ whose gradient with respect to the sensor output is 1.6 times the standard gamma function is used.

It may be noted that an image signal that is light can be obtained without increasing the time required for reading since the standard lighting time T1 is used as the lighting time in this case.

Figure 5B:
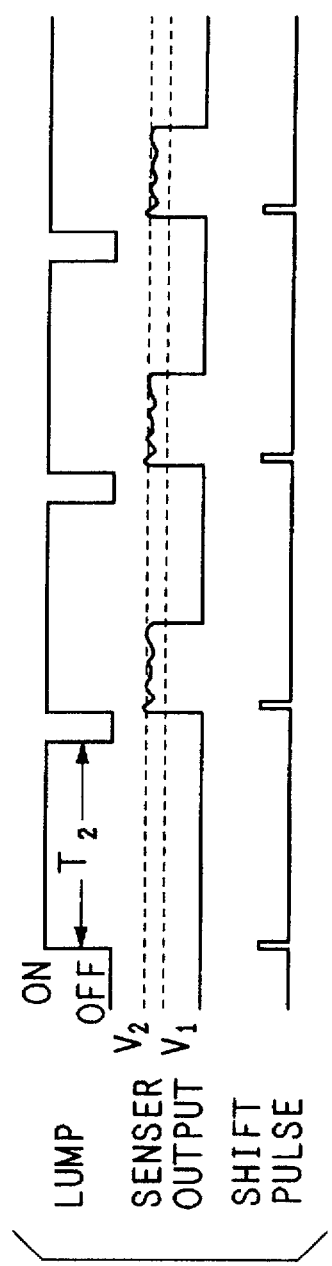

However, it is not only the signal component but also noise component contained in the sensor output that are regularly converted with the gamma function $Y_2$ in this case. Therefore, the noise component becomes noticeable in the image signal. Thus, a detailed reading operation with increased lightness and suppressed noise is required in some cases depending on the image quality of an original or on the use of an image signal. In such a case, the user inputs both a lightness increase command and a high image quality reading operation command at the same time to the personal computer and sends such commands to the image reading apparatus. In response thereto, the controller 19 of the image reading apparatus not only instructs the gamma correction section 17 to select the standard gamma function $Y_1$, but also selects a lighting time longer than the standard lighting time T1, e.g., the lighting time T2 that is 1.6 times longer than T1 if lightness is to be set one level higher, and directs the light source control section 10 to select such lighting time T2, so that the image reading apparatus starts the detailed reading operation with such settings. The reading operation timings for this case are shown in FIG. 5(b).

When the original is irradiated for such a long time as the lighting time T2, the amount of charges stored in the line sensor 5 is increased in proportion to the lighting time. Therefore, as shown in FIG. 3, even if an original of the same density d1 has been read, the signal V outputted from the line sensor 5 becomes a large signal V2 that is about 1.6 times the signal obtained by using the standard lighting time T1. Hence, the image signal whose level is I2 can be obtained even if the standard gamma function $Y_1$ is used.

Although the reading time is increased since the longer lighting time T2 is used, a high quality, light image can be obtained.

Figure 5C:
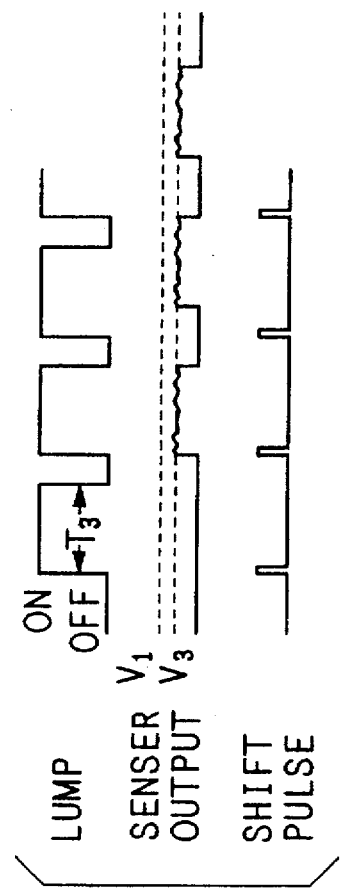

On the other hand, in the case where the density of an original is low and the lightness of the image displayed as a result of the preliminary reading operation performed with the standard setting is too high, the user takes the steps of setting the lightness one level lower, and then sending a detailed reading operation start signal from the computer to the image reading apparatus. In response thereto, the controller 19 of the image reading apparatus not only uses the standard gamma function $Y_1$, but also selects the lighting time T3 that is 1/1.6 times the standard lighting time T1 as the lighting time of the lamp. The reading operation timings for this case are shown in FIG. 5(c).

Figure 4:
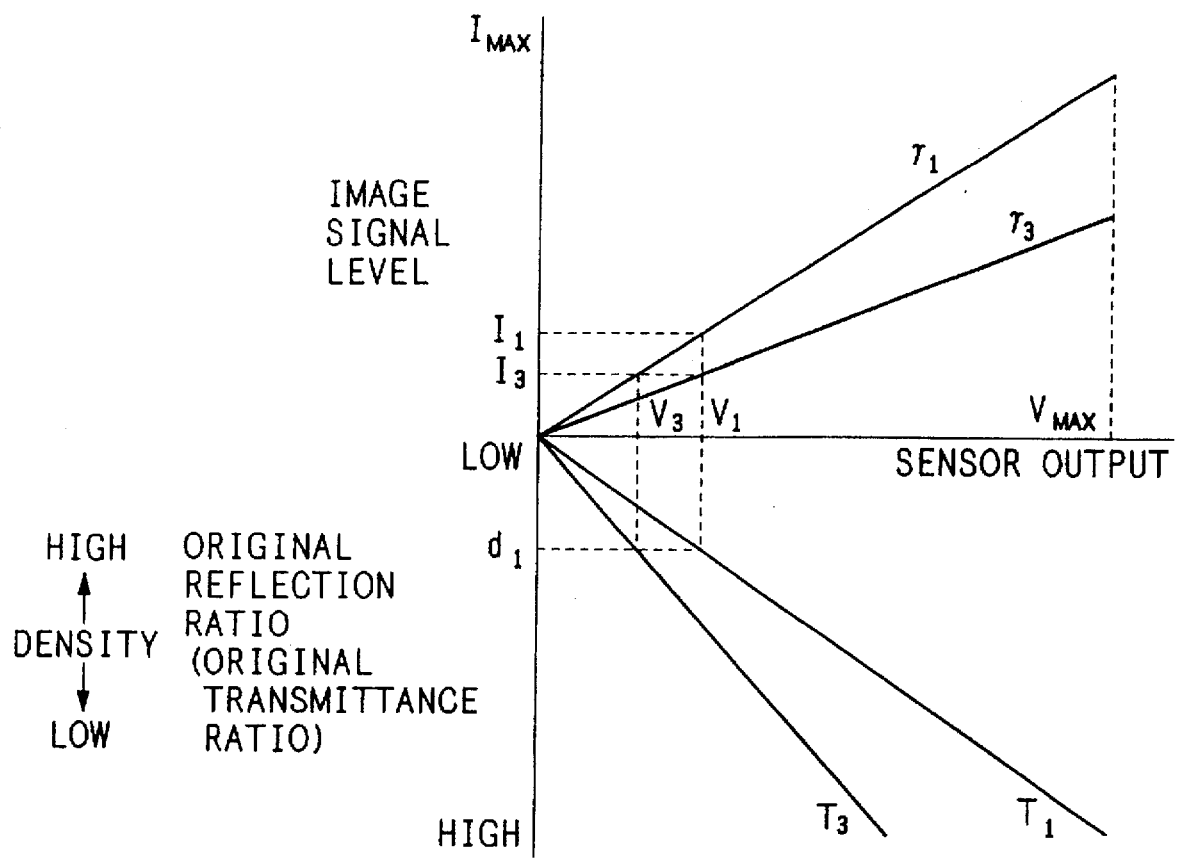
FIG. 4 is a diagram showing a relationship among the reflectance of an original, the sensor output, and the image signal level in the case where lightness is decreased in the embodiment shown in FIG. 1.

As a result of this operation, a signal V3 whose level is T3/T1 (lighting time ratio) lower is outputted from the line sensor 5 as shown in FIG. 4. This signal V3 is converted into an image signal with the standard gamma function $Y_1$, and an image signal I3 whose level is lower (darker) than in the case of using the standard lighting time T1 is outputted.

In this case, the reading operation is ended within a shorter time than in the case of using the standard setting as much as the lighting time is shortened.

If the user wishes a further improvement in the image quality than an improvement in the reading speed, then the user sends a high image quality reading command to the image reading apparatus from the computer. In response thereto, the controller 19 of the image reading apparatus not only uses the standard lighting time T1 as the lighting time, but also selects the low density original gamma function $Y_3$ that has a lower gradient than the standard gamma function $Y_1$.

As a result of this operation, the image signal from the line sensor 5 has the same level V1 as in the case of using the standard setting as shown in FIG. 4. However, since the gradient of the gamma function $Y_3$ is small, an image signal I3 that is smaller than that obtained by using the standard setting is obtained. In this case, noise is reduced compared with the case of using the shorter lighting time T3 since the standard lighting time T1 is used. Therefore, a high quality image can be obtained.

As described above, this embodiment is characterized as allowing the user to specify a desired lightness after the user checks the result of the preliminary reading operation performed with the standard settings and then causing the image reading apparatus to perform the detailed reading operation while automatically selecting the lighting time and the gamma function in response to the lightness specification so that an image of specified lightness can be outputted from the image reading apparatus. Therefore, the user can readily adjust the reading operation mode based on such a factor as lightness through which the user can easily recognize and estimate the current condition visually. That is, easy adjustment is an advantage. In addition, even if the same lightness is specified, the user can select a high speed reading mode or a high image quality reading mode, and the lighting time and the gamma function can be adjusted automatically in accordance with the selected mode. Therefore, the image reading apparatus of the invention can provide reading operation that meets user needs.

It may be noted that if the user can simulate whether the specified lightness is appropriate or not on the screen displaying the result of a preliminary reading operation in advance when the user specifies the lightness for a detailed reading operation after the user checks the result of the preliminary reading operation, then the user can dispense with unnecessary repetition of detailed reading operations in setting the appropriate lightness. To do this, it is desired that special software be installed to the computer, the software being such as to process the image data displayed on the display as a result of the preliminary reading operation using the gamma function according to the specified lightness and display rough image data with lightness increased or decreased. Specifically, the software is set in such a manner that an increase in lightness leads to an increase in each value of image data R, G, B 1.6 times as much. If such values exceed the maximum (e.g., 255) that the image data can take, then it may, of course, be so processed that the image data is set to the maximum, and the image data may be so displayed on the display. That is, it is the software, not the image reading apparatus, that converts the image data with the same gamma function as the gamma function $Y_2$ selected by the image reading apparatus.

Further, while the value of a light amount signal is changed by adjusting the light source lighting time in this embodiment if the high image quality reading mode is selected, as a method equivalent thereto, it is, of course, possible to change the value of a light amount signal by adjusting the interval of a shift pulse of the line sensor while continuously turning the lamp on.

While the above describes the embodiment of the invention, the invention may be embodied in various other modes. For example, instead of using the three kinds of lighting times and the three kinds of gamma functions in increasing or decreasing the level of lightness, a larger number of lighting times and gamma functions may be prepared so that finer lightness adjustments can be made.

Still further, with respect to the gamma function, if the user can select or prepare a gamma function having an arbitrary gradient and shape using the computer in addition to the gamma functions prepared by the image reading apparatus and can use such selected or prepared gamma function for detailed reading operation by downloading such gamma function to the image reading apparatus, then freedom in reading is further increased. In this case, if software that can process image data that has been subjected to preliminary reading operation with the selected or prepared gamma function is installed to the computer, then the effect of the prepared gamma function can be simulated, which is an advantage for the user.

As described in the foregoing, the invention can provide an image reading apparatus that can read originals having different densities with desired lightnesses, and can meet image reading needs of the user by providing a high speed reading mode requiring a shorter reading time, a high image quality reading mode though the reading speed is not so high, or a like mode when such originals are to be read with desired lightnesses.

What is claimed is:

1. An image reading apparatus comprising:

a light source for irradiating an original;

line sensors for converting a light from the original into an electric signal;

image converting means for converting the electric signal to an image data through a gamma function;

light amount signal adjusting means for adjusting a light amount signal outputted from the line sensor by varying one of a lighting time of the light source and an interval of a shift pulse of the line sensor;

gamma function adjusting means for adjusting the gamma function; and a mode selecting means for selecting one of a first reading mode and a second reading mode, the first reading mode for obtaining image data having a predetermined lightness through adjustment of the light amount signal made by the light amount signal adjusting means, the second reading mode for obtaining image data having the predetermined lightness through adjustment of the gamma function made by the gamma function adjusting means.

2. The image reading apparatus according to claim 1, wherein the light amount signal adjusting means adjusts one of the lighting time of the light source and the interval of the shift pulse of the line sensor in the first reading mode, and wherein the gamma function adjusting means adjusts the gamma function in the second reading mode, to obtain image data having a specified lightness.

3. The image reading apparatus according to claim 1, said gamma function adjusting means comprising:

means for storing gamma function, wherein the image converting means converting the electric signal to the image data uses a gamma function received from said means for storing gamma function.

4. The image reading apparatus according to claim 2, said gamma function adjusting means comprising:

means for storing a gamma function, wherein the image converting means converting the electric signal to the image data uses a gamma function received from said means for storing gamma function.

5. A lightness adjustment method in an image reading system including an image reading apparatus capable of externally adjusting a lightness of an output image and an external apparatus for adjusting the lightness with respect to the image reading apparatus, the method comprising the steps of:

performing a preliminary reading operation of an original by the image reading apparatus and sending the image data obtained by a result of the preliminary reading operation to the external apparatus;

displaying the image data obtained by a result of the preliminary reading operation on the external apparatus;

inputting an input lightness adjustment data to the external apparatus;

processing the image data obtained by a result of the preliminary reading operation based on the inputted lightness adjustment data on the external apparatus and displaying the processed image data; and sending the inputted lightness adjustment data to the image reading apparatus.

6. A lightness adjustment method in an image reading system including an image reading apparatus capable of externally adjusting a lightness of an output image and an external apparatus for adjusting the lightness with respect to the image reading apparatus, the method comprising the steps of:

performing a preliminary reading operation of an original by the image reading apparatus and sending image data obtained by a result of the preliminary reading operation to the external apparatus;

displaying the image data obtained by a result of the preliminary reading operation on the external apparatus;

inputting an input lightness adjustment data to the external apparatus;

processing the image data obtained by a result of the preliminary reading operation based on the inputted lightness adjustment data by the external apparatus and displaying the processed image data;

sending the inputted lightness adjustment data to the image reading apparatus;

selecting one mode from a first reading mode and a second reading mode and sending the selected mode to the image reading apparatus, the first reading mode being for obtaining image data of a predetermined lightness from adjustment of the light source or adjustment of an interval of a shift pulse of a line sensor, the second reading mode being for obtaining image data of the predetermined lightness from an adjustment of a gamma function; and obtaining detailed image data with the predetermined lightness based on the inputted lightness adjustment data and the selected mode data by the image reading apparatus.

7. An image reading system for performing a detailed reading operation after a lightness of an output image is adjusted and a high image quality reading mode or a high speed reading mode is selected, the image reading system comprising:

rough reading means for roughly reading an original by reducing an amount of the data within a predetermined range of the original and storing image data read by said rough reading means in an image memory;

display means for displaying as the output image the image data stored in the image memory, which were read by the rough reading means in advance;

lightness specifying means for adjusting a lightness by viewing the displayed output image, produced by the reading of the rough reading means, and then specifying a predetermined lightness for the displayed output image;

mode selecting means for selecting one mode from a high image quality reading mode and a high speed reading mode, the high image quality reading mode for reading the image data by controlling image quality, the high speed reading mode for reading image data by controlling reading speed; and detailed reading means for performing a detailed reading operation with the lightness set by the lightness adjusting means, and with the mode selected by the mode selecting means.

8. The image reading system according to claim 7, wherein the image reading system performs either of a control for adjusting a lighting time of a light source or an interval of a shift pulse of line sensors in the high image quality reading mode and a control for adjusting a gamma function in the high speed reading mode.

9. The image reading system according to claim 7, wherein the image reading system performs either of a control for adjusting a lighting time of light sources or an interval of a shift pulse of a line sensor in the high image quality reading mode and a control for adjusting a gamma function in the high speed reading mode.

* * * * *